April 27, 1965
M. BALLESTRA
3,180,699
METHOD FOR CARRYING OUT CONTINUOUSLY THE
STOICHIOMETRIC NEUTRALIZATION
OF A SULPHONIC ACID
Filed Sept. 19, 1960
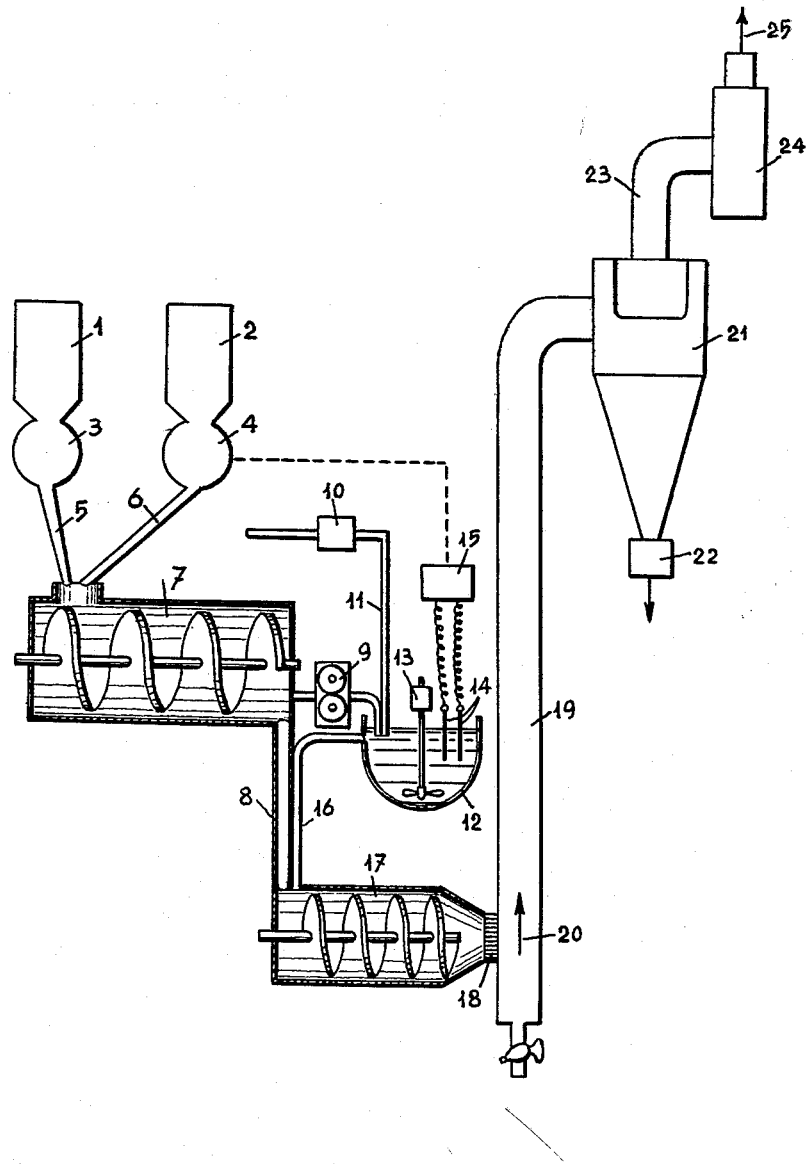

United States Patent Office 3,180,699
Patented Apr. 27, 1965

3,180,699
METHOD FOR CARRYING OUT CONTINUOUSLY THE STOICHIOMETRIC NEUTRALIZATION OF A SULPHONIC ACID
Mario Ballestra, Via Pertinace 2/4, Genoa, Italy
Filed Sept. 19, 1960, Ser. No. 57,022
Claims priority, application Italy, Oct. 31, 1959, Patent 619,663
2 Claims. (Cl. 23—1)

The present invention relates to reactions in which a mixture of the reactive elements, particularly neutralization reactions under certain conditions reacts only when in presence of such as a mixture of an acid and a base which acts as a primer or catalyst.

The invention involves a method of carrying out a chemical reaction, such as a neutralization reaction between an anhydrous sulfonic acid and an anhydrous base which reacts only in the presence of water and comprises producing continuously a mixture of substances in stoichiometric proportions, which substances react only in presence of a primer, or catalyst, which, for the neutralization of an anhydrous sulphonic acid and an anhydrous base is water, and adding said primer or catalyst to the stoichiometrically proportioned and intimately mixed reactive substances whereby complete reaction is obtained among the well-divided particles of the reactive substances so that undesirable side-reactions are avoided and if necessary, the reaction temperature is easily regulated.

The above method is also characterized in that after the production of the intimate mixture of substances in stoichiometric proportions, such as a stoichiometric mixture of an anhydrous sulphonic acid and an anhydrous base, a portion of said mixture is separated and reacted with the acid-base mixture is total quantity of primer or catalyst required for the total mass of reactive substances, and the conditions of said reaction for example, the pH of the thus-neutralized portion of sulphonic acid-base mixture is automatically used to control and vary the proportions of acid and base in the continuously produced main body of the mixture.

The reaction is further characterised in that the reaction in the main part of the mixture is started by adding thereto the primer or catalyst and that portion of the mixture which has already reacted with an excess of the primer or catalyst that is for a neutralization reaction, the neutralized portion of the acid and base which contains the quality of water required for neutralization of the entire mixture of acid and base is mixed with the remaining main body of the mixture.

The reaction conveniently proceeds within a mixer-conveyor which is heated or cooled as necessary, according to the reaction temperature.

The installation to embody the above method comprises at least two proportioning devices for the stoichiometic proportioning of a least two reagents, and at least one mixer for mixing the reagents, a part of the resulting mixture being added to primer substance contained in a mixer where it is kept moving by a suitable agitator, said primer substance being calculated on the basis of the total mass of the reagents a device is placed in the moving mass which defines an excess of any reagent and which automatically regulates the proportion of the reagents.

The neutralization reactions the regulating device is conveniently a pH-meter.

The installation may comprise at least one other mixer, in the beginning of which the primer, such as water, together with that part of the reagent-mixture already reacted come into contact with the main part of the reagent mixture and the reaction proceeds within the mixer. This mixture may be supplied with heating or cooling means as necessary.

In the case of a solid product, the installation is further characterized by a least one end die-plate provided after the second mixer, to accomplish an initial drying, and at least one separator, into which the final product of the reaction arrives carried pneumatically in the form of granular powder, and from which the granular part, now dried is discharged, while the powder carried by the air and directed to the chimney goes to deposit into a suitable powder receptacle.

A diagram of an installation which uses a granular powdered product is shown by way of example in the accompanying drawing.

With reference to the single figure: 1 and 2 are feeding containers for the reactive substances, 3 and 4 are the continuous proportioning devices which feed predetermined proportions of the two reactive substances into the screw mixer 7 by means of piping 5 and 6; 8 is the discharge pipe of the said mixer 7; 9 is a pump drawing out a portion of the mixture of the reactive substance near the outlet of the mixer 7; 10 is a continuous proportioning device for the primer substance; 11 is the piping carrying the said primer substance into the container 12 provided with the agitation device 13; 14 is a suitable device to determine the eventual excess of one of the two reactive substances and 15 is a controller suitably in the form of a pH meter acting on the proportion device of said reactive substance to correct the composition of the mixture; 17 is another screw mixer within which takes place the beginning and the proceeding of the reaction; 18 is a die plate, through which is passed the reacted mass by the propelling action of the screw in the mixer, 19 is a pneumatic conveyor carrying the reaction product in the direction of the arrow 20; 21 is a centrifugal separator; 22 is the discharge pipe of said separator; 23 is a suction pipe conveying the powder to the purifier 24, the purified air leaning from the chimney in the direction of the arrow 25.

By way of example, the working of the installation is described with reference to the neutralization of a sulphonic acid with sodium carbonate. These two substances mixed with each other in the anhydrous state do not react. The reaction is started by introducing water which may be considered the primer or catalyst of this reaction. The method and installation comprise two separated containers 1 and 2 for the two reactive substances and two proportion devices for the stoichiometric proportioning of the said reactive substances which are separately conveyed to the mixer 7 where they are closely mixed and carried along by a screw conveyor. A portion of said reactive substances so mixed is drawn out by pump 9 and fed to a container 12, provided with an agitation device 13, into which container is fed through the pipe 11 and by means of the continuous proportion device 10, the amount of water necessary for the reaction of the entire mass of reactive substances provided by the two proportion devices 3 and 4. The reactive substances substances when introduced into the water, react, and the pH-meter 15 registering the acidity or alkalinity of the sample acts on the proportion device 4 of one of the reactive substances suitably varying its proportioning in order to reach the perfect stoichiometric proportion. The product from container 12 together with the water acting as a primer, comes into contact with the mass of the two reactive substances which has passed down into the second mixer 17 through pipe 8 this mixer also being a screw-type mixer. In said mixer 17 the reaction takes place and its product is compressed by the action of the same screw conveyor which presses the product against the die plate 18, through which it is pressed in order to be subjected to a first drying. This drying is completed by the pneumatic conveyor 19 and the centrifugal separator 21, from which the product is removed in the form of granular powder; the fine powder follows the suction pipe which goes to the chimney, and passes through a dust separator 24 within which it is retained while the air free from the powder reaches the chimney in the direction of the arrow 25.

Many modification and variations may of course be made in embodying the invention, concerning either the type of first mixer, varying accordingly as the reactive substances are liquid or solid and as the products are liquid or solid, or the type of the second mixer with the die-plate. The pneumatic conveyor and the centrifugal separator are not present when the product is liquid; all these modifications and variations are however based on the main ideas of the invention.

What I claim:

1. A method of carrying out a neutralization reaction between an anhydrous sulphonic acid and an anhydrous base effective to neutralize said acid wherein said acid and said base react only in the presence of water which comprises producing continuously an intimate mixture of said sulphonic acid and said base in stoichiometric proportions in the absence of water, separating a portion of said stoichiometrically proportioned and intimate mixture of said sulphonic acid and said base, mixing said portion of reactants with the amount of water required for the neutralization of the entire mixture of sulphonic acid and base, determining the degree of acidity of the solution of the thus-neutralized portion of reactants varying automatically the proportion of said anhydrous sulphonic acid and said anhydrous base in said continuously produced mixture according to the degree of acidity of said neutralized portion of reactants to obtain said sulphonic acid and said base in exact stoichiometric proportions, and mixing said solution of neutralized reactants which contains the amount of water required for neutralization of the entire mixture with the remaining portion of said mixture of anhydrous sulphonic acid and anhydrous base.

2. A method as defined in claim 1 wherein said base is a carbonate.

References Cited by the Examiner
UNITED STATES PATENTS

| | | | |
|---|---|---|---|
| 631,287 | 8/99 | Euston | 23—260 |
| 1,078,541 | 11/13 | Ellis | 23—260 X |
| 1,843,012 | 1/32 | Bucherer | 23—1 |
| 2,131,905 | 10/38 | Strezynski et al. | 23—260 |
| 2,373,793 | 4/45 | Susie | 260—505 |
| 2,604,383 | 7/52 | Morse | 23—253 |
| 2,642,336 | 6/53 | Greenawalt | 23—260 X |
| 2,890,929 | 6/59 | Rummert | 23—1 |

MAURICE A. BRINDISI, *Primary Examiner.*